United States Patent
Mori et al.

(10) Patent No.: US 9,559,556 B2
(45) Date of Patent: Jan. 31, 2017

(54) STATOR OF ROTATING ELECTRIC MACHINE

(75) Inventors: Akio Mori, Chiryu (JP); Akito Akimoto, Kariya (JP); Atsuo Ishizuka, Nagoya (JP)

(73) Assignee: DENSO CORPORATION, Kariya (JP)

( * ) Notice: Subject to any disclaimer, the term of this patent is extended or adjusted under 35 U.S.C. 154(b) by 456 days.

(21) Appl. No.: 14/110,316

(22) PCT Filed: Apr. 5, 2012

(86) PCT No.: PCT/JP2012/059330
§ 371 (c)(1),
(2), (4) Date: Nov. 26, 2013

(87) PCT Pub. No.: WO2012/137862
PCT Pub. Date: Oct. 11, 2012

(65) Prior Publication Data
US 2014/0062230 A1  Mar. 6, 2014

(30) Foreign Application Priority Data
Apr. 7, 2011 (JP) ................. 2011-085124

(51) Int. Cl.
*H02K 3/14* (2006.01)
*H02K 3/46* (2006.01)
(Continued)

(52) U.S. Cl.
CPC *H02K 3/04* (2013.01); *H02K 3/12* (2013.01); *H02K 3/14* (2013.01); *H02K 3/46* (2013.01);
(Continued)

(58) Field of Classification Search
CPC .............. H02K 3/00; H02K 3/04; H02K 3/12; H02K 3/14; H02K 3/16; H02K 3/24
(Continued)

(56) References Cited

U.S. PATENT DOCUMENTS 5,886,444 A * 3/1999 Enomoto ................. H02K 3/12
310/179
6,404,091 B1  6/2002 Nakamura et al.
(Continued)

FOREIGN PATENT DOCUMENTS

JP  2000-350425  12/2000
JP  2003-264964  9/2003
(Continued)

OTHER PUBLICATIONS

International Preliminary Report on Patentability (11 pgs.) dated Oct. 17, 2013 issued in corresponding International Application No. PCT/JP2012/059330.
(Continued)

*Primary Examiner* — Quyen Leung
*Assistant Examiner* — Minki Chang
(74) *Attorney, Agent, or Firm* — Nixon & Vanderhye P.C.

(57) ABSTRACT

A stator includes an annular stator core having a plurality of slots arranged in the circumferential direction at predetermined intervals and a stator coil formed of a plurality of electric conductor wires mounted on the stator core. Each of the electric conductor wires has a plurality of in-slot portions received in the slots of the stator core and a plurality of turn portions that connect, on the outside of the slots, adjacent pairs of the in-slot portions. The stator coil has first and second coil end parts and that respectively protrude axially outward from a pair of axial end faces of the stator core. At each of the coil end parts, the turn portions of the electric conductor wires are stacked in a radial direction of the stator core, and the axial heights h1 of the turn portions are set so as to gradually increase from the radially inside to the radially outside.

6 Claims, 11 Drawing Sheets

(51) Int. Cl.
- *H02K 3/12* (2006.01)
- *H02K 3/04* (2006.01)
- *H02K 15/00* (2006.01)
- *H02K 9/00* (2006.01)
- *H02K 3/24* (2006.01)

(52) U.S. Cl.
CPC .......... *H02K 9/005* (2013.01); *H02K 15/0031* (2013.01); *H02K 15/0081* (2013.01); *H02K 3/24* (2013.01); *H02K 2213/03* (2013.01)

(58) Field of Classification Search
USPC .............. 310/179, 180, 198, 201, 195, 202, 203, 310/207
See application file for complete search history.

(56) References Cited

U.S. PATENT DOCUMENTS

| | | | | |
|---|---|---|---|---|
| 2004/0041491 | A1* | 3/2004 | Gorohata | H02K 3/12 310/187 |
| 2005/0108870 | A1* | 5/2005 | Harada | H02K 3/02 29/606 |
| 2008/0148551 | A1* | 6/2008 | Hara | H02K 15/0081 29/596 |
| 2009/0260222 | A1* | 10/2009 | Akimoto | H02K 15/0478 29/605 |
| 2009/0322178 | A1* | 12/2009 | Dobashi | H02K 15/0037 310/195 |
| 2010/0001609 | A1* | 1/2010 | Ishigami | H02K 3/12 310/202 |
| 2010/0264760 | A1* | 10/2010 | Matsui | H02K 9/19 310/54 |

FOREIGN PATENT DOCUMENTS

| | | |
|---|---|---|
| JP | 2007-89273 | 4/2007 |
| JP | 2009-95167 | 4/2009 |
| JP | 2010-259145 | 11/2010 |

OTHER PUBLICATIONS

Office Action (1 pg.) dated Jun. 19, 2014 issued in corresponding Japanese Application No. 2011-085124 and English translation (2 pgs.).

International Search Report for PCT/JP2012/059330 mailed May 22, 2012.

Office Action (1 pg.) dated Dec. 12, 2013 issued in corresponding Japanese Application No. 2011-085124 with an at least partial English-language translation thereof (2 pgs.).

Office Action (8 pgs.) dated Jun. 18, 2015 issued in corresponding Chinese Application No. 201280023557.6 with an at least partial English language translation (11 pgs.).

* cited by examiner

ABOUT 3m

STATOR OF ROTATING ELECTRIC MACHINE

This application is the U.S. national phase of International Application No. PCT/JP2012/059330 filed 5 Apr. 2012 which designated the U.S. and claims priority to JP 2011-085124 filed 7 Apr. 2011, the entire contents of each of which are hereby incorporated by reference.

TECHNICAL FIELD

The present invention relates to stators of rotating electric machines that are used in, for example, motor vehicles as electric motors and electric generators.

BACKGROUND ART

Conventionally, there are known stators of rotating electric machines which include an annular stator core and a stator coil. The stator core has a plurality of slots arranged in the circumferential direction at predetermined intervals. The stator coil is formed of a plurality of electric conductor wires mounted on the stator core. In addition, each of the electric conductor wires has a plurality of in-slot portions received in the slots of the stator core and a plurality of turn portions that connect, on the outside of the slots, adjacent pairs of the in-slot portions.

Moreover, each of the electric conductor wires forming the stator coil may be made up of one wave-shaped continuous electric conductor wire that includes a plurality of in-slot portions and a plurality of turn portions. Otherwise, each of the electric conductor wires may be made up of a plurality of substantially U-shaped electric conductor segments each of which includes a pair of straight portions and a turn portion that connects a pair of ends of the straight portions. More specifically, each of the electric conductor wires may be formed by connecting predetermined pairs of open end portions of the electric conductor segments on one axial side of the stator core. In addition, in Patent Document 1, there is disclosed a method of forming the substantially U-shaped electric conductor segments.

The stator coil has a pair of coil end parts that respectively protrude axially outward from a pair of axial end faces of the stator core. In addition, at each of the coil end parts, there are stacked, in a radial direction of the stator core, the turn portions of the electric conductor wires or connecting portions of the electric conductor wires which are formed by connecting the predetermined pairs of open end portions of the electric conductor segments.

PRIOR ART DOCUMENT

Patent Document

[PATENT DOCUMENT 1] Japanese Unexamined Patent Application Publication No. 2003-264964

SUMMARY OF THE INVENTION

Problems to be Solved by the Invention

In the rotating electric machines as described above, when the temperature of the stator coil becomes high due to electric current flowing in the stator coil, the electric resistance increases, thus lowering the performance. Therefore, coolant, such as cooling liquid or cooling air, is supplied to the coil end parts of the stator coil from the radially outside, thereby cooling the stator coil and the stator core. In this case, the supplied coolant flows on the surfaces of the stator coil and the stator core, thereby cooling them.

However, in the above conventional stator coil, the axial heights of the coil end parts are uniform. Hence, there is a problem that when the coolant is supplied from the radially outside, radially outer portions of the coil end parts can be cooled, but radially inner portions of the coil end parts cannot be sufficiently cooled.

The present invention has been made in view of the above-described circumstances and aims to solve the problem of providing a stator of a rotating electric machine which can improve the performance of cooling the stator coil.

Means for Solving Problems

A first aspect of the disclosure, which has been made for solving the above-described problem, provides a stator of a rotating electric machine. The stator includes an annular stator core having a plurality of slots arranged in a circumferential direction at predetermined intervals and a stator coil formed of a plurality of electric conductor wires mounted on the stator core. The stator is characterized in that: the stator coil has a pair of coil end parts that respectively protrude axially outward from a pair of axial end faces of the stator core; at each of the coil end parts, the electric conductor wires are stacked in a radial direction of the stator core; for each radially-adjacent pair of the electric conductor wires, an axial height of the radially outer electric conductor wire is set to be equal to or greater than that of the radially inner electric conductor wire; and the axial height of the radially outermost electric conductor wire is set to be greater than that of the radially innermost electric conductor wire.

According to the first aspect, among the electric conductor wires radially stacked at the coil end parts, those electric conductor wires which have a smaller axial height than the adjacent radially outer electric conductor wires partially protrude axially inward from the adjacent radially outer electric conductor wires, and the protruding parts thereof are in an exposed state when viewed from the radially outside. Consequently, the contact area between those electric conductor wires and a coolant, such as a cooling liquid or cooling air, supplied to the coil end parts are increased, thereby sufficiently improving the effect of cooling the stator coil by the coolant.

Moreover, at the coil end parts, it is possible to set the axial heights of the radially outermost electric conductor wires to be largest. Consequently, when the coolant is supplied from the radially outside of the coil end parts, it is easy for the coolant to flow into the coil end parts, whereby the effect of cooling the stator coil can be further improved.

In the present invention, when the electric conductor wires are radially stacked at the coil end parts in three or more layers, it is preferable to set the axial heights of the electric conductor wires to gradually increase from the radially inside to the radially outside of the coil end parts, thereby making all the axial heights of the electric conductor wires located at different radial positions different from each other. In this case, the contact area between all the electric conductor wires other than the radially outermost electric conductor wires and the coolant can be increased, thereby making it possible to cool the radially-stacked electric conductor wires evenly in the radial direction. Consequently, it is possible to maximally improve the cooling effect.

In addition, in terms of improving the effect of cooling the stator coil, it is preferable to increase the difference in axial height between the radially outermost electric conductor wires and the radially innermost electric conductor wires at the coil end parts. However, with the increase in the difference in axial height, the size of the stator coil is accordingly increased. Therefore, it is preferable to set the axial heights of the electric conductor wires based upon consideration of the balance therebeween.

A second aspect is characterized in that: at each of the coil end parts of the stator coil, each of the electric conductor wires has a plurality of oblique portions that are oblique to a corresponding one of the axial end faces of the stator core at predetermined angles; for each radially-adjacent pair of the oblique portions of the electric conductor wires, the oblique angle of the radially outer oblique portion is set to be equal to or greater than that of the radially inner oblique portion; and the oblique angles of the radially outermost oblique portions of the electric conductor wires are set to be greater than those of the radially innermost oblique portions of the electric conductor wires.

According to the second aspect, among the oblique portions radially stacked at the coil end parts, those oblique portions which have a smaller oblique angle than the adjacent radially outer oblique portions partially protrude axially inward from the adjacent radially outer oblique portions, and the protruding parts thereof are in an exposed state when viewed from the radially outside. Consequently, the contact area between those oblique portions and the coolant supplied to the coil end parts are increased, thereby more sufficiently improving the effect of cooling the stator coil by the coolant.

Moreover, at the coil end parts, the oblique angles of the radially outermost oblique portions are set to be largest. Consequently, when the coolant is supplied from the radially outside of the coil end parts, it is easy for the coolant to flow into the coil end parts, whereby the effect of cooling the stator coil can be more sufficiently improved.

In the present invention, when the oblique portions are radially stacked at the coil end parts in three or more layers, it is preferable to set the oblique angles of the oblique portions to gradually increase from the radially inside to the radially outside of the coil end parts, thereby making all the oblique angles of the oblique portions located at different radial positions different from each other. In this case, the contact area between all the oblique portions other than the radially outermost oblique portions and the coolant can be increased, thereby making it possible to cool the radially-stacked oblique portions evenly in the radial direction. Consequently, it is possible to maximally improve the cooling effect. In addition, in the present invention, it is also preferable to set the oblique angles of the oblique portions based upon consideration of the balance between the effect of cooling the stator coil and the increase in size of the stator coil.

A third aspect is characterized in that each of the oblique portions of the electric conductor wires is stair-shaped to include a plurality of sections that extend substantially parallel to the corresponding axial end face of the stator core.

According to the third aspect, since the oblique portions are stair-shaped, the contact area between the oblique portions and the coolant are further increased, thereby further improving the effect of cooling the stator coil. Moreover, with the stair shape of the oblique portions, it is possible to reduce the axial height of the coil end parts that respectively protrude from the axial end faces of the stator core and to reduce the radial width of the coil end parts, thereby minimizing the stator coil.

A fourth aspect is characterized in that: each of the electric conductor wires has a plurality of in-slot portions received in the slots of the stator core and a plurality of turn portions that connect, on the outside of the slots, adjacent pairs of the in-slot portions; each of the turn portions includes, at its circumferential center, an apex section that extends substantially parallel to the corresponding axial end face of the stator core; at each of the coil end parts of the stator coil, for each radially-adjacent pair of the apex sections of the turn portions of the electric conductor wires, a length in an electric conductor wire-extending direction of the radially outer apex section is set to be equal to or greater than that of the radially inner apex section; and the length in the electric conductor wire-extending direction of the radially outermost apex sections of the turn portions of the electric conductor wires is set to be greater than that of the radially innermost apex sections of the turn portions of the electric conductor wires.

According to the fourth aspect, at each of the coil end parts, among the radially-stacked apex sections, the contact area between those apex sections which have a smaller extending-direction length than the adjacent radially outer apex sections and the coolant supplied to the coil end parts are increased, thereby further improving the effect of cooling the stator coil by the coolant.

Moreover, the extending-direction length of the radially outermost apex sections can be set to be largest. Consequently, when the coolant is supplied from the radially outside of the coil end parts, it is easy for the coolant to flow into the coil end parts, whereby the effect of cooling the stator coil can be further improved.

In the present invention, when the apex sections are radially stacked at the coil end parts in three or more layers, it is preferable to set the extending-direction lengths of the apex sections to gradually increase from the radially inside to the radially outside of the coil end parts, thereby making all the extending-direction lengths of the apex sections located at different radial positions different from each other. In this case, the contact area between all the apex sections other than the radially outermost apex sections and the coolant can be increased, thereby making it possible to cool the radially-stacked apex sections evenly in the radial direction. Consequently, it is possible to maximally improve the cooling effect.

A fifth aspect is characterized in that: at each of the coil end parts of the stator coil, for each radially-adjacent pair of the electric conductor wires, the radially inner electric conductor wire does not protrude axially outward from the radially outer electric conductor wire; and the radially innermost electric conductor wires protrude axially inward from the radially outermost electric conductor wires.

According to the fifth aspect, among the electric conductor wires radially stacked at the coil end parts, those electric conductor wires which do not protrude axially outward from the adjacent radially outer electric conductor wires can be conversely made to protrude axially inward therefrom. Consequently, the protruding parts will be in an exposed state when viewed from the radially outside; the contact area between those electric conductor wires and the coolant can be increased by the exposed protruding parts. As a result, it is possible to sufficiently improve the effect of cooling the stator coil by the coolant supplied to the coil end parts.

Moreover, since the radially outermost electric conductor wires protrude most axially outward, when the coolant is supplied from the radially outside of the coil end parts, it is easy for the coolant to flow into the coil end parts, whereby the effect of cooling the stator coil can be sufficiently improved.

In the present invention, when the electric conductor wires are radially stacked at the coil end parts in three or more layers, it is preferable to arrange all the electric conductor wires so as to partially protrude axially inward from the adjacent radially outer electric conductor wires. In this case, the contact area between all the electric conductor wires other than the radially outermost electric conductor wires and the coolant can be increased, thereby making it possible to cool the radially-stacked electric conductor wires evenly in the radial direction. Consequently, it is possible to maximally improve the cooling effect. In addition, in the present invention, it is also preferable to set the amounts, by which the electric conductor wires protrude axially inward from the adjacent radially outer electric conductor wires, based upon consideration of the balance between the effect of cooling the stator coil and the increase in size of the stator coil.

A sixth aspect is characterized in that at each of the coil end parts of the stator coil, the axial heights of the electric conductor wires are set so as to gradually increase from the radially inside to the radially outside of the coil end part.

According to the sixth aspect, the contact area between all the electric conductor wires other than the radially outermost electric conductor wires at the coil end parts and the coolant can be increased. Consequently, it is possible to efficiently and evenly improve the effect of cooling the stator coil.

A seventh aspect is characterized in that: each of the electric conductor wires is made up of one continuous electric conductor wire which includes a plurality of in-slot portions and a plurality of turn portions, the in-slot portions extending straight in parallel with each other and being arranged in a longitudinal direction of the electric conductor wire at predetermined intervals, the turn portions connecting adjacent pairs of the in-slot portions; each of the coil end parts of the stator coil is formed of those turn portions of the electric conductor wires which are located on one same axial side of the stator core; at each of the coil end parts of the stator coil, for each radially-adjacent pair of the turn portions of the electric conductor wires, the axial height of the radially outer turn portion is set to be equal to or greater than that of the radially inner turn portion; and the axial height of the radially outermost turn portions of the electric conductor wires is set to be greater than that of the radially innermost turn portions of the electric conductor wires.

According to the seventh aspect, among the turn portions radially stacked at the coil end parts, the contact area between those turn portions which have a smaller axial height than the adjacent radially outer turn portions and the coolant supplied to the coil end parts are increased. Consequently, it is possible to sufficiently improve the effect of cooling the stator coil by the coolant.

Moreover, at the coil end parts, the axial heights of the radially outermost turn portions can be set to be largest. Consequently, when the coolant is supplied from the radially outside of the coil end parts, it is easy for the coolant to flow into the coil end parts, whereby the effect of cooling the stator coil can be sufficiently improved.

An eighth aspect is characterized in that: each of the electric conductor wires is formed by connecting a plurality of electric conductor segments into a predetermined state, each of the electric conductor segments having a pair of straight portions, a turn portion that connects a pair of ends of the straight portions, and a pair of open end portions that are formed by bending the other ends of the straight portions; one of the coil end parts of the stator coil is comprised of the turn portions of the electric conductor segments of the electric conductor wires, the turn portions being located on one axial side of the stator core; the other coil end part is comprised of a plurality of connecting portions that are formed by connecting predetermined pairs of the open end portions of the electric conductor segments of the electric conductor wires, the open end portions being located on the other axial side of the stator core; at the one coil end part, for each radially-adjacent pair of the turn portions of the electric conductor wires, the axial height of the radially outer turn portion is set to be equal to or greater than that of the radially inner turn portion; the axial height of the radially outermost turn portions of the electric conductor wires is set to be greater than that of the radially innermost turn portions of the electric conductor wires; at the other coil end part, for each radially-adjacent pair of the connecting portions of the electric conductor wires, the axial height of the radially outer connecting portion is set to be equal to or greater than that of the radially inner connecting portion; and the axial height of the radially outermost connecting portions of the electric conductor wires is set to be greater than that of the radially innermost connecting portions of the electric conductor wires.

According to the eighth aspect, among the turn portions radially stacked at the one coil end part, the contact area between those turn portions which have a smaller axial height than the adjacent radially outer turn portions and the coolant supplied to the one coil end part are increased Moreover, among the connecting portions radially staked at the other coil end part, the contact area between those connecting portions which have a smaller axial height than the adjacent radially outer connecting portions and the coolant supplied to the other coil end part are increased. Consequently, it is possible to sufficiently improve the effect of cooling the stator coil by the coolant supplied to the coil end parts.

Moreover, at the one coil end part, the axial heights of the radially outermost turn portions can be set to be largest; at the other coil end part, the axial heights of the radially outermost connecting portions can be set to be largest. Consequently, when the coolant is supplied from the radially outside of the coil end parts, it is easy for the coolant to flow into the coil end parts, whereby the effect of cooling the stator coil can be sufficiently improved.

A ninth aspect is characterized in that each of the coil end parts of the stator coil is supplied with coolant from the radially outside of the stator core.

According to the ninth aspect, since the axial height of the radially outermost electric conductor wires is set to be greater than that of the radially innermost electric conductor wires at the coil end parts, it is easy for the coolant supplied from the radially outside of the stator core to flow into the coil end parts, whereby the cooling effect by the coolant can be more reliably exerted.

EMBODIMENTS FOR CARRYING OUT THE INVENTION

Hereinafter, embodiments that embody a stator of a rotating electric machine according to the present invention will be described in detail with reference to the drawings.

First Embodiment

Figure 1:
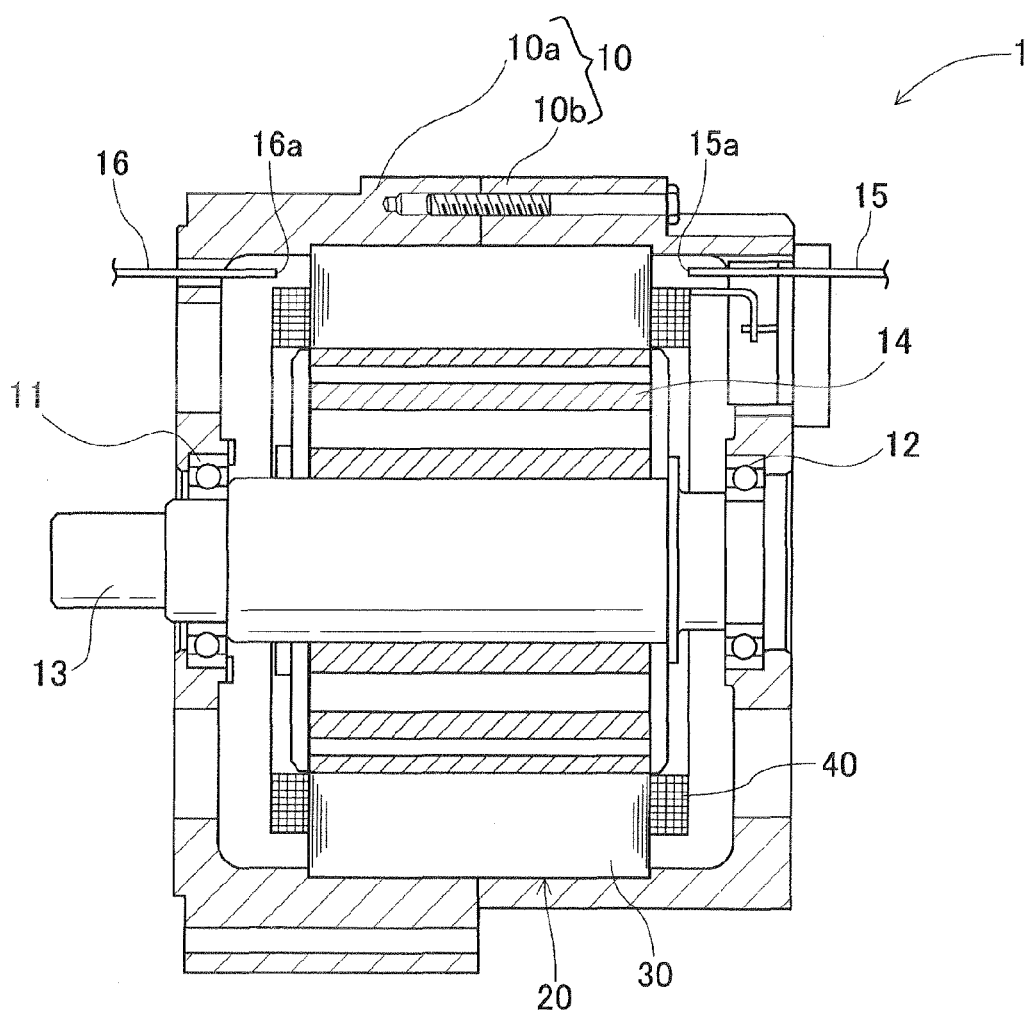
FIG. 1 is an axial cross-sectional view illustrating the overall configuration of a rotating electric machine in which is mounted a stator according to a first embodiment.

A stator of the present embodiment is configured to be mounted in a rotating electric machine that is used as an automotive alternator. FIG. 1 is an axial cross-sectional view schematically showing the configuration of the rotating electric machine in which the stator of the present embodiment is mounted. As shown in FIG. 1, the rotating electric machine 1 according to the present embodiment includes: a housing 10 which is comprised of a pair of substantially cup-shaped housing members 10a and 10b that are joined together at the open ends thereof; a rotating shaft 13 that is rotatably supported by the housing 10 via bearings 11 and 12; a rotor 14 fixed on the rotating shaft 13; and the stator 20 that is fixed in the housing 10 so as to surround the rotor 14 in the housing 10.

Moreover, in the rotating electric machine 1, there is provided a coolant supply means which includes a pair of coolant pipes 15 and 16 for supplying a coolant to a stator coil 40 of the stator 20. The coolant pipes 15 and 16 are mounted in such a state as to respectively penetrate the housing members 10a and 10b, so as to make the inside of the housing 10 communicate with the outside. At distal ends of the coolant pipes 15 and 16, there are provided discharge openings 15a and 16a. The discharge openings 15a and 16a open on the vertically upper side of first and second coil end parts 47 and 48 of the stator coil 40 of the stator 20 received in the housing 10.

In addition, in the rotating electric machine 1, there are also provided a collection means (not shown) and a cooler (not shown) in a circulation path. The collection means collects the coolant discharged from the discharge openings 15a and 16a and returns the collected coolant to the coolant supply means, thereby circulating the coolant. The cooler cools the heated coolant. Moreover, as the coolant, though ATF (Automatic Transmission Fluid) is used in the present embodiment, it is also possible to use, for example, cooling oil used in the conventional rotating electric machines.

The rotor 14 has, on its radially outer periphery facing the radially inner periphery of the stator 20, a plurality of permanent magnets that are arranged in the circumferential direction at predetermined intervals. By those permanent magnets, a plurality of magnetic poles are formed the polarities of which alternate between N and S in the circumferential direction. The number of the magnetic poles may be suitably set according to the design specification of the rotating electric machine. In the present embodiment, the rotor 14 has a total of eight magnetic poles (i.e., four N poles and four S poles).

Figure 2A:
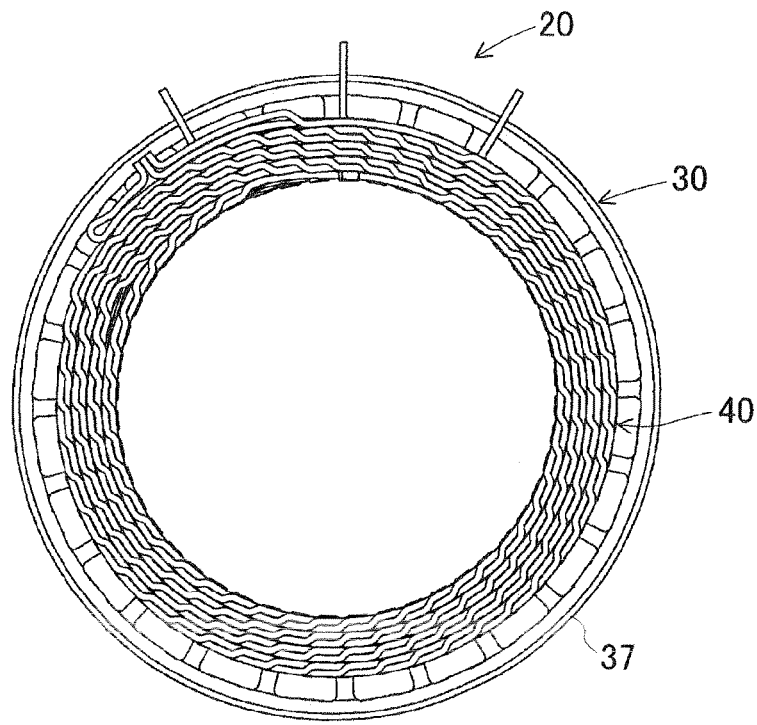
FIG. 2A is an axial end view of the stator according to the first embodiment.
Figure 2B:
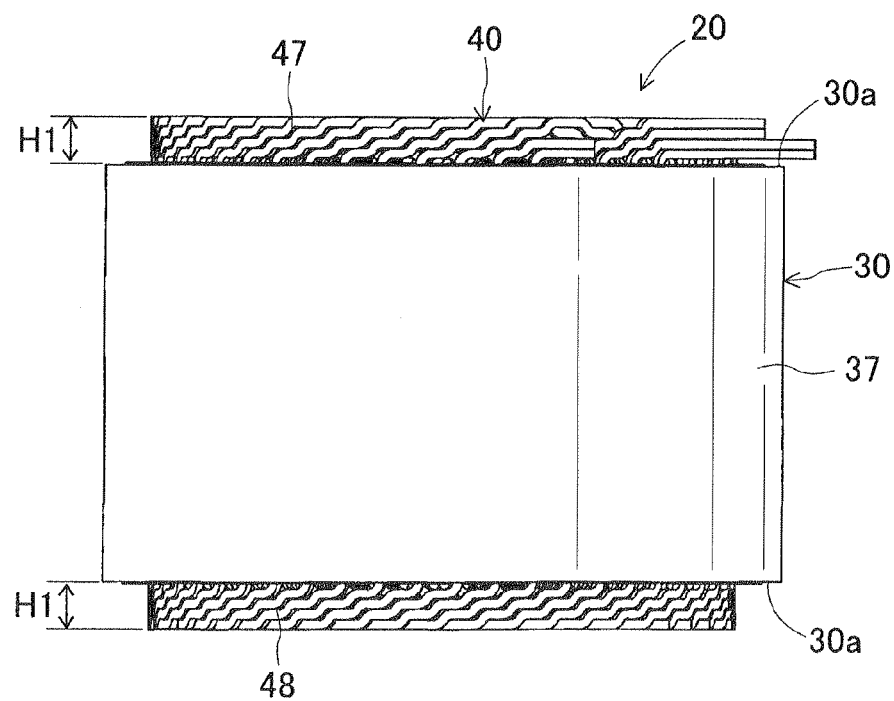
FIG. 2B is a side view of the stator according to the first embodiment.

Next, the stator 20 will be described with reference to FIGS. 2A-10. The stator 20 includes, as shown in FIGS. 2A-2B, an annular stator core 30 that is obtained by assembling a plurality of core segments 32, and the three-phase stator coil 40 that is formed of a plurality of electric conductor wires 50 mounted on the stator core 30. In addition, insulating paper may be interposed between the stator core 30 and the stator coil 40.

Figure 3:
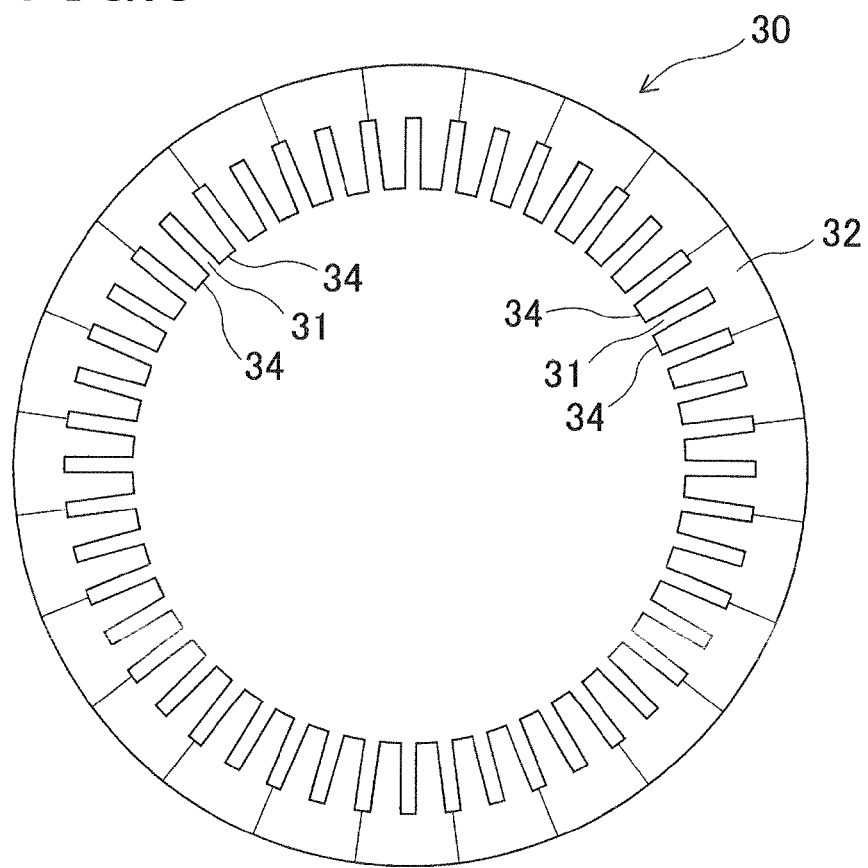
FIG. 3 is an axial end view of a stator core according to the first embodiment.
Figure 4:
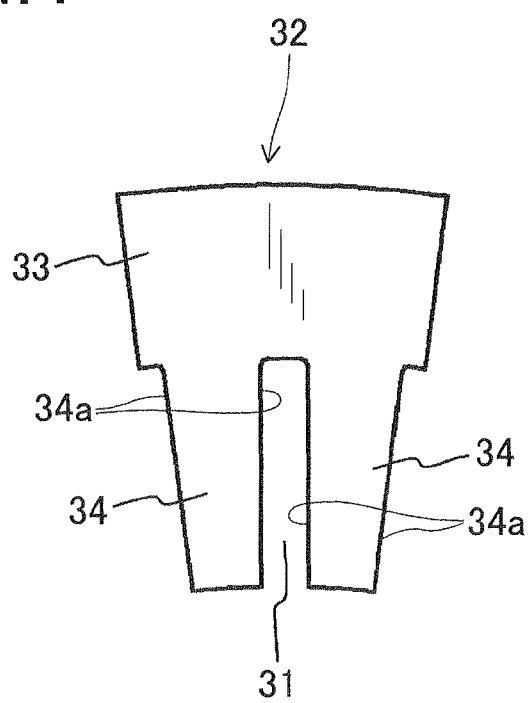
FIG. 4 is a plan view of a core segment according to the first embodiment.

The stator core 30 is formed, as shown in FIGS. 3 and 4, by connecting the plurality (e.g., 24 in the present embodiment) of core segments 32 so as to make them adjoin one another in the circumferential direction. Moreover, the stator core 30 has a plurality of slots 31 that are formed in the radially inner surface of the stator core 30 and arranged in the circumferential direction at predetermined intervals. The stator core 30 includes an annular back core portion 33 located on the radially outer side and a plurality of teeth 34 that protrude from the back core portion 33 radially inward and are arranged in the circumferential direction at predetermined intervals. Between each circumferentially-facing pair of side surfaces 34A of adjacent teeth 34, there is formed one slot 31 that radially extends and opens on the radially inner surface of the stator core 30. For each circumferentially-facing pair of the side surfaces 34A of adjacent teeth 34, i.e., for each pair of the side surfaces 34A which defines one slot 31, the two side surfaces 34A extend parallel to each other. Consequently, each of the slots 31 radially extends at a constant circumferential dimension.

In the present embodiment, there are provided two slots 31 per magnetic pole of the rotor 14 that has the eight magnetic poles and per phase of the three-phase stator coil 40. Accordingly, the total number of the slots 31 formed in the stator core 30 is equal to 48 (i.e., 8×3×2). In addition, the total number of the teeth 34 formed in the stator core 30 is also equal to 48.

In addition, each of the core segments 32 forming the stator core 30 is obtained by laminating a plurality of magnetic steel sheets in the axial direction of the stator core 30; the magnetic steel sheets are formed by press punching into a predetermined shape. Moreover, the stator core 30 is fixed (or shape-retained) in the annular shape by fitting an outer cylinder 37 onto the radially outer peripheries of the core segments 32 that are assembled into the annular shape (see FIG. 2A).

Figure 5:
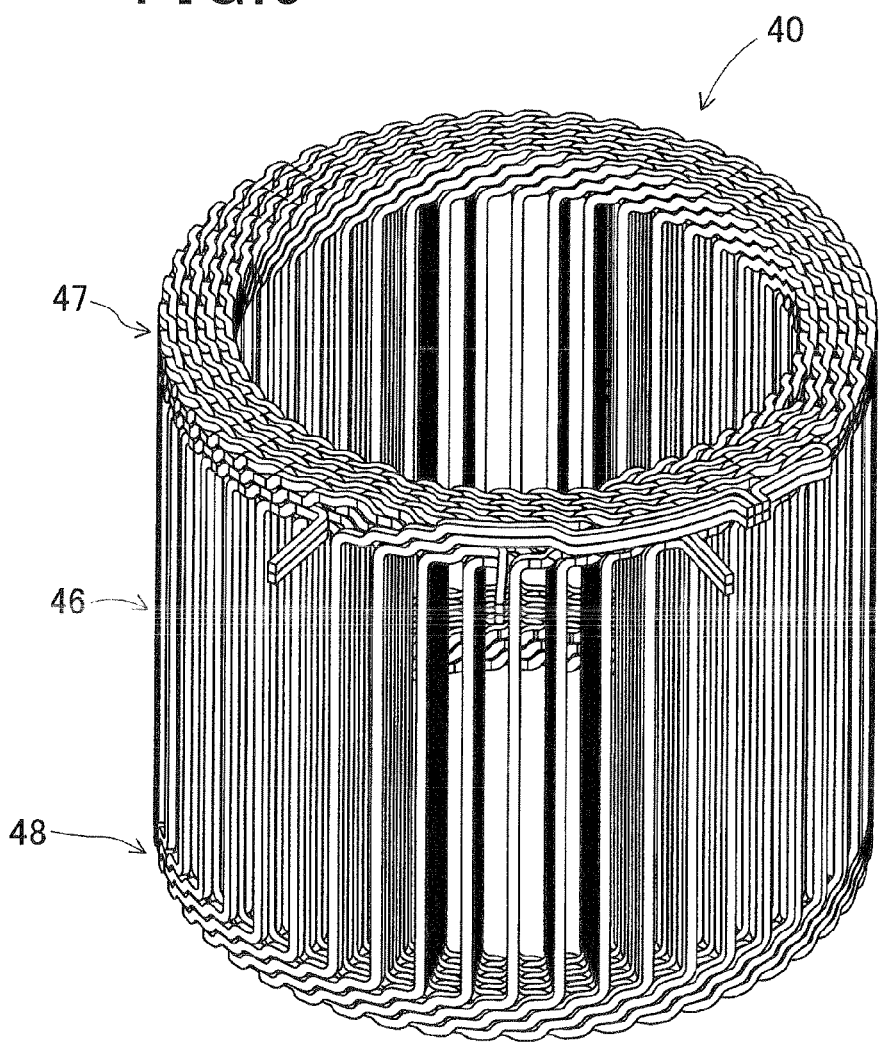
FIG. 5 is a perspective view of a stator coil according to the first embodiment.

The stator coil 40 is formed by first stacking the plurality (twelve in the present embodiment) of electric conductor wires 50, which are formed into a predetermined wave shape, to obtain a flat band-shaped electric conductor wire assembly and then rolling the electric conductor wire assembly by a predetermined number of turns into a cylindrical shape as shown in FIG. 5.

Figure 6:
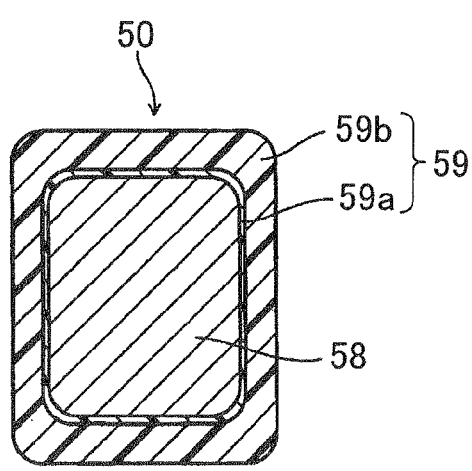
FIG. 6 is a cross-sectional view of an electric conductor wire forming the stator coil according to the first embodiment.

Each of the electric conductor wires (or electric wires) 50 forming the stator coil 40 is configured with, as shown in FIG. 6, an electric conductor 58 and an insulating coat 59 that covers the outer periphery of the electric conductor 58. The electric conductor 58 has a rectangular cross section and is made of copper. The insulating coat 59 consists of an inner layer 59a and an outer layer 59b. The thickness of the insulating cost 59, which is the sum of thicknesses of the inner and outer layers 59a and 59b, is set to be in the range of 100 to 200 μm. Consequently, with such a large thickness of the insulating coat 59, it is unnecessary to interpose insulating paper between the electric conductor wires 50 for electrically insulating them from each other.

Further, the outer layer 59b is made of an insulating material such as nylon. The inner layer 59a is made of a thermoplastic resin having a higher glass transition temperature than the outer layer 59b or an insulating material having no glass transition temperature such as a polyamide-imide resin. Consequently, the outer layer 59b will be solidified by heat generated in the rotating electric machine 1 earlier than the inner layer 59a. As a result, the surface hardness of the outer layer 59b will be increased, thereby making it difficult for the electric conductor wire 50 to be damaged.

Figure 7:
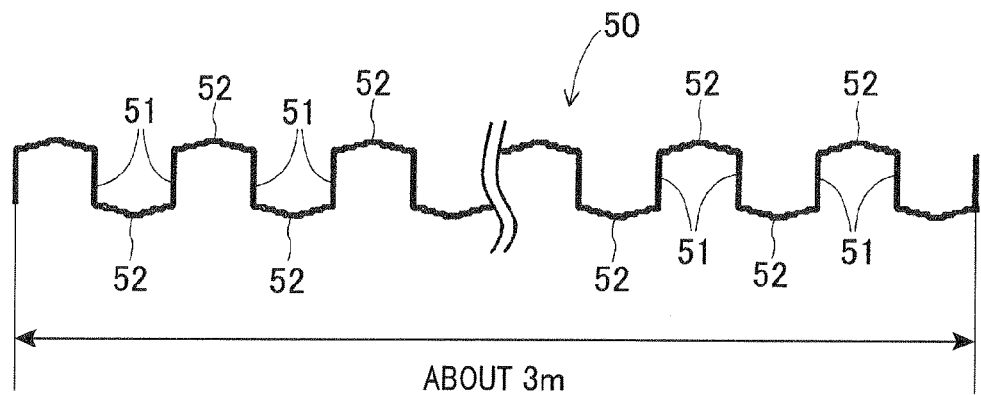
FIG. 7 is a front view illustrating the overall shape of the electric conductor wire according to the first embodiment.

As shown in FIG. 7, each of the electric conductor wires 50 is made up of one continuous electric conductor wire which has a plurality of in-slot portions 51 and a plurality of turn portions 52. The in-slot portions 51 extend straight in parallel with each other and are arranged in a longitudinal direction of the electric conductor wire at predetermined intervals. The turn portions 52 connect, alternately on opposite sides of the in-slot portions 51, adjacent pairs of the in-slot portions 51. The length of the one continuous electric conductor wire is about 3 m. Consequently, as shown in FIG. 5, the stator coil 40 has an in-slot portion-stacked part 46 at its axially central part and the first and second coil end parts 47 and 48 at its axially opposite ends. The in-slot portion-stacked part 46 is formed by the stacking of the in-slot portions 51 of the electric conductor wires 50 in radial directions of the stator core 30. The first and second coil end parts 47 and 48 are formed by the stacking (in eight layers in the present embodiment) of the turn portions 52 of the electric conductor wires 50 in radial directions of the stator core 30; the turn portions 52 protrude axially outward from the respective axial end faces of the stator core 30.

Figure 8:
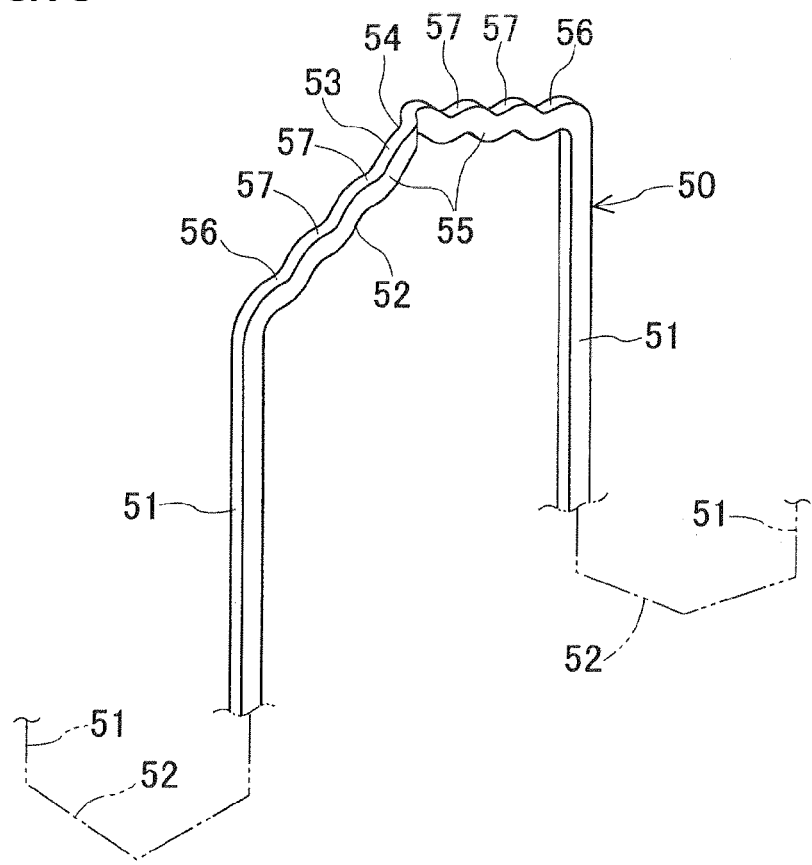
FIG. 8 is a perspective view illustrating the shape of a turn portion of the electric conductor wire according to the first embodiment.

As shown in FIG. 8, substantially at the center in the extending direction of each of the turn portions 52 of the electric conductor wires 50, there is provided an apex section 53 that extends substantially parallel to an axial end face 30a of the stator core 30. On both sides of the apex section 53, there are provided stair-shaped oblique portions 55 that are oblique to the end face 30a of the stator core 30 at predetermined angles. At the apex section 53, there is a crank portion 54 formed along the end face 30a of the stator core 30 into a crank shape without twisting. The amount of radial position offset made by the crank shape of the crank portion 54 is substantially equal to the width of the electric conductor wires 50. Consequently, it is possible to arrange each radially-adjacent pair of the turn portions 52 of the electric conductor wires 50 in intimate contact with each other. As a result, the radial width of the first and second coil end parts 47 and 48 can be reduced, thereby preventing the stator coil 40 from protruding radially outward.

Further, each of the turn portions 52 of the electric conductor wires 50 includes a pair of sections 56 that extend substantially parallel to the axial end face 30a of the stator core 30 and respectively adjoin the pair of in-slot portions 51 which are connected by the turn portion 52. Consequently, the protruding height h1 of the turn portion 52 from the end face 30a of the stator core 30 is reduced. As a result, the height H1 of the first and second coil end parts 47 and 48 is reduced.

Furthermore, the following dimensional relationship is satisfied: $d1 \leq d2$, where d1 is the length of the sections 56 of the turn portions 52 of the electric conductor wires 50 and d2 is the distance between each circumferentially-adjacent pair of the slots 31. Consequently, it is possible to prevent the sections 56 of each of the turn portions 52 from interfering with other turn portions 52 that protrude from those slots 31 which are circumferentially adjacent to the slot 31 from which the turn portion 52 protrudes. Accordingly, it is possible to prevent the height H1 or the radial width of the first and second coil end parts 47 and 48 from being increased for avoiding interference between the turn portions 52 which respectively protrude from circumferentially-adjacent slots 31. As a result, the height H1 of the first and second coil end parts 47 and 48 can be reduced. Further, since the radial width of the first and second coil end parts 47 and 48 can be reduced, it is possible to prevent the stator coil 40 from protruding radially outward.

Moreover, each of the turn portions 52 of the electric conductor wires 50 further includes, between the crank portion 54 and each of the pair of sections 56, a pair of sections 57 that extend substantially parallel to the axial end face 30a of the stator core 30. That is, in each of the turn portions 52 of the electric conductor wires 50, there are formed, including the apex section 53, a total of seven sections that extend substantially parallel to the end face 30a of the stator core 30. Consequently, compared to the case of providing no section extending substantially parallel to the end face 30a of the stator core 30, the protruding height h1 of the turn portion 52 from the end face 30a of the stator core 30 can be significantly reduced. In addition, by providing the sections 56 and 57 that extend substantially parallel to the end face 30a of the stator core 30, both the oblique portions 55 which are respectively positioned on opposite sides of the apex section 53 are shaped into a stair.

Figure 9:
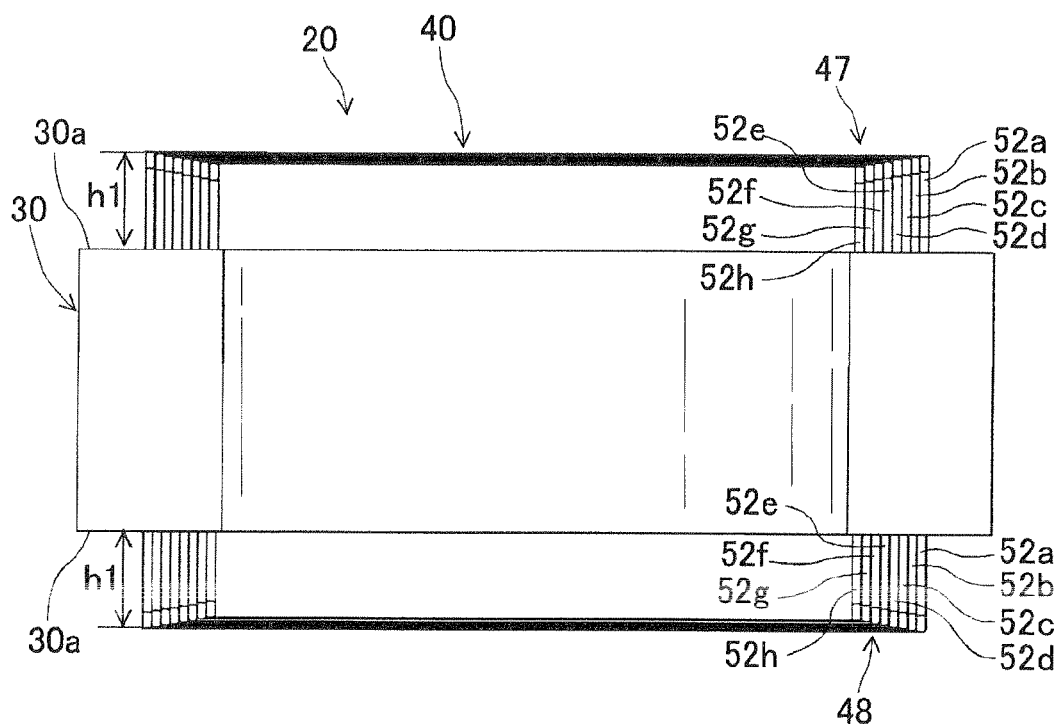
FIG. 9 is a front view, from the radially outside, of turn portions that are radially stacked and arranged at first and second coil end parts of the stator coil according to the first embodiment.
Figure 10:
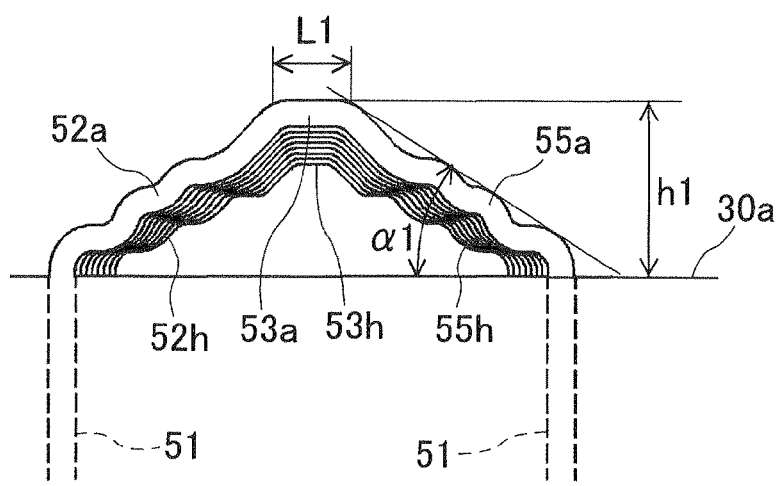
FIG. 10 is a front view, from the radially outside, of the turn portions that are radially stacked and arranged at the first coil end part of the stator coil according to the first embodiment.

In the stator coil 40 of the present embodiment, as shown in FIGS. 9 and 10, at the first and second coil end parts 47 and 48 that are formed by the radial stacking of the plurality of turn portions 52a-52h, for each radially-adjacent pair of the turn portions 52, the axial height (i.e., the protruding height from the corresponding axial end face 30a of the stator core 30) h1 of the radially outer turn portion 52 is set to be greater than that of the radially inner turn portion 52.

This relationship of axial height h1 applies to all the turn portions 52 at the first and second coil end parts 47 and 48. Thus, the axial height h1 of the turn portions 52a which are located most radially outward is set to be largest; the axial height h1 of the turn portions 52h which are located most radially inward is set to be smallest. Moreover, at the first and second coil end parts 47 and 48, the axial heights h1 of the turn portions 52 gradually increase from the radially inside to the radially outside of the first and second coil end parts 47 and 48; all the axial heights h1 of the turn portions 52a-52h located at different radial positions are different from each other.

In other words, for each radially-adjacent pair of the turn portions 52 at the first and second coil end parts 47 and 48, the axial height h1 of the radially inner turn portion 52 is set to be less than that of the radially outer turn portion 52. Therefore, the radially inner turn portion 52 is offset and thus protrudes axially inward from the radially outer turn portion 52 by a predetermined amount. That is, as shown FIG. 10, when the first and second coil end parts 47 and 48 are viewed from the radially outside, the turn portions 52b-52h other than the radially outermost turn portion 52a are offset and thus protrude axially inward from the adjacent radially outer turn portions 52, thereby exposing the protruding parts thereof. Consequently, the contact area between the turn portions 52b-52h other than the radially outermost turn portion 52a at the first and second coil end parts 47 and 48 and the coolant are increased by the protruding parts thereof.

Moreover, for the apex sections 53 of the turn portions 52, the lengths L1 thereof in the extending directions of the electric conductor wires 50 are set so as to gradually increase from the radially inside to the radially outside of the first and second coil end parts 47 and 48 (see FIG. 10). Thus, the length L1 of the apex sections 53a of the radially outermost turn portions 52a at the first and second coil end parts 47 and 48 is set to be largest, whereas the length L1 of the apex sections 53h of the radially innermost turn portions 52h is set to be smallest.

Furthermore, for the stair-shaped oblique portions 55 of the turn portions 52, the oblique angles α1 thereof with respect to the corresponding end faces 30a of the stator core 30 are set so as to gradually increase from the radially inside to the radially outside of the first and second coil end parts 47 and 48 (see FIG. 10). Thus, the oblique angles α1 of the oblique portions 55a which are located most radially outward at the first and second coil end parts 47 and 48 are set to be largest, whereas the oblique angles α1 of the oblique portions 55h which are located most radially inward are set to be smallest.

That is, in the present embodiment, with the first and second coil end parts 47 and 48 configured as described above, the coolant, which is supplied from the cooling pipes 15 and 16 of the coolant supply means to the radially outside of the first and second coil end parts 47 and 48, can easily flow radially inward of the first and second coil end parts 47 and 48. Further, the coolant, which has flowed to the radially inside of the first and second coil end parts 47 and 48, can make contact with the surfaces of all the turn portions 52 in a wider range. Consequently, it is possible to improve the effect of cooling the stator coil 40 by the coolant supplied to the first and second coil end parts 47 and 48.

In addition, the stator coil 40 and the stator core 30 are assembled by: inserting the teeth 34 of the core segments 32 from the radially outside of the cylindrical stator coil 40; arranging all the core segments 32 along the stator coil 40 into the annular shape; and fitting the outer cylinder 37 onto the radially outer peripheries of the core segments 32. Consequently, as shown in FIGS. 2A-2B, the in-slot portions 51 of the electric conductor wires 50 are received in the corresponding slots 31 of the stator core 30. More specifically, for each of the electric conductor wires 50, each adjacent pair of the in-slot portions 51 of the electric conductor wire 50 are respectively received in two slots 31 that are circumferentially away from each other by a predetermined number of slots (e.g., six slots in the present embodiment). Moreover, the turn portions 52 of the electric conductor wires 50, which connect adjacent pairs of the in-slot portions 51, respectively protrude from the corresponding end faces 30a of the stator core 30, thereby forming the first and second coil end parts 47 and 48 at the axial ends of the stator coil 40.

In the rotating electric machine 1 which includes the stator 20 of the present embodiment configured as described above, upon start of the operation, the coolant is discharged from the discharge openings 15a and 16a of the coolant pipes 15 and 16 by the coolant supply means. The coolant discharged from the discharge openings 15a and 16a is then supplied to the radially outside of the first and second coil end parts 47 and 48. Further, the supplied coolant flows into the first and second coil end parts 47 and 48 from the radially outside, and then flows to the radially inside along the inner surfaces of the turn portions 52 and the end faces 30a of the stator core 30, cooling the first and second coil end parts 47 and 48.

At this time, since the axial height h1 of the radially outermost turn portions 52a at the first and second coil end parts 47 and 48 is set to be largest, the coolant, which is supplied to the radially outside of the first and second coil end parts 47 and 48, can easily flow into the first and second coil end parts 47 and 48 and then smoothly flow to the radially inside along the surfaces of the turn portions 52.

Moreover, since the axial heights h1 of the turn portions 52 at the first and second coil end parts 47 and 48 gradually increase from the radially inside to the radially outside and thus the contact area between the turn portions 52 other than the radially outermost turn portions 52a and the coolant are increased, the first and second coil end parts 47 and 48 can be efficiently and effectively cooled by the coolant which easily flows into the first and second coil end parts 47 and 48 and smoothly flows from the radially outside to the radially inside along the inner surfaces of the turn portions 52.

In addition, the coolant, which has cooled the first and second coil end parts 47 and 48 and the stator core 30, is collected and returned to the coolant supply means by the collection means. Thereafter, the coolant is again discharged from the discharge openings 15a and 16a, thereby being circulated.

In the stator 20 of the rotating electric machine 1 of the present embodiment configured as described above, for each radially-adjacent pair of the turn portions 52 of the electric conductor wires 50 at the first and second coil end parts 47 and 48, the axial height h1 of the radially outer turn portion 52 is set to be greater than that of the radially inner turn portion 52, and the radially inner turn portion 52 protrudes axially inward and is thus exposed from the radially outer turn portion 52. Consequently, the contact area between the radially-stacked turn portions 52 of the first and second coil end parts 47 and 48 and the coolant are increased, thereby sufficiently improving the cooling effect by the coolant supplied to the first and second coil end parts 47 and 48.

In particular, in the present embodiment, since the axial heights h1 of the turn portions 52 of the electric conductor wires 50 at the first and second coil end parts 47 and 48 are set so as to gradually increase from the radially inside to the radially outside, all the turn portions 52 other than the radially outermost turn portions 52a protrude axially inward and thus are exposed from the adjacent radially outer turn portions 52. Consequently, the contact area between all the turn portions 52 other than the radially outermost turn portions 52a at the first and second coil end parts 47 and 48 and the coolant are increased, and it is therefore possible to efficiently and evenly improve the effect of cooling the first and second coil end parts 47 and 48 (the stator coil 40).

Moreover, since the axial height h1 of the radially outermost turn portions 52a is set to be largest at the first and second coil end parts 47 and 48, the coolant, which is supplied from the radially outside of the first and second coil end parts 47 and 48, can easily flow into the first and second coil end parts 47 and 48, thereby sufficiently improving the effect of cooling the first and second coil end parts 47 and 48 (the stator coil 40).

Furthermore, in the present embodiment, each of the turn portions 52 of the electric conductor wires 50 includes the oblique portions 55 on both sides of the apex section 53. For each radially-adjacent pair of the oblique portions 55 at the first and second coil end parts 47 and 48, the oblique angle α1 of the radially outer oblique portion 55 is set to be greater than the oblique angle α1 of the radially inner oblique portion 55. That is, the radially inner oblique portion 55 is arranged so as to protrude axially inward and thus be exposed from the radially outer oblique portion 55. Consequently, it is possible to sufficiently improve the effect of cooling the stator coil 40 by the coolant supplied to the first and second coil end parts 47 and 48.

In particular, in the present embodiment, since the oblique angles α1 of the oblique portions 55 are set so as to gradually increase from the radially inside to the radially outside of the first and second coil end parts 47 and 48, all the oblique portions 55 other than the radially outermost oblique portions 55a protrude axially inward and thus are exposed from the adjacent radially outer oblique portions 55. Consequently, the contact area between all the oblique portions 55 other than the radially outermost oblique portions 55a at the first and second coil end parts 47 and 48 and the coolant (or outside air) are increased, and it is therefore possible to efficiently and evenly improve the effect of cooling the first and second coil end parts 47 and 48 (the stator coil 40).

Moreover, since the oblique angle α1 of the radially outermost oblique portions 55a is set to be largest at the first and second coil end parts 47 and 48, the coolant, which is supplied from the radially outside of the first and second coil end parts 47 and 48, can easily flow into the first and second coil end parts 47 and 48, thereby sufficiently improving the effect of cooling the first and second coil end parts 47 and 48 (the stator coil 40).

Furthermore, since the oblique portions 55 are stair-shaped, the contact area between the oblique portions 55 and the coolant are further increased, thereby further improving the effect of cooling the first and second coil end parts 47 and 48 (the stator coil 40). Moreover, with the stair shape of the oblique portions 55, it is possible to reduce the axial height (i.e., the protruding height from the end faces 30a of the stator core 30) H1 of the first and second coil end parts 47 and 48 that respectively protrude from the end faces 30a of the stator core 30 and to reduce the radial width of the first and second coil end parts 47 and 48, thereby minimizing the stator coil 40.

Furthermore, each of the turn portions 52 of the electric conductor wires 50 in the present embodiment has the apex section 53 at the center in the extending direction. For each radially-adjacent pair of the apex sections 53 at the first and second coil end parts 47 and 48, the extending-direction length L1 of the radially outer apex section 53 is set to be greater than the extending-direction length L1 of the radially inner apex section 53. Consequently, the turn portions 52, which respectively have those apex sections 53 which have a shorter extending-direction length L1 than the adjacent radially outer apex sections 53 among all the apex sections 53 radially stacked at the first and second coil end parts 47 and 48, are increased in contact area between their oblique portions 55 and the coolant. Therefore, it is possible to further improve the effect of cooling the stator coil 40 by the coolant supplied to the first and second coil end parts 47 and 48.

In addition, the stator coil 40 of the present embodiment is of such a type that it is formed of the continuous electric conductor wires 50, each of which has the plurality of in-slot portions 51 and the plurality of turn portions 52, and both the first and second coil end parts 47 and 48 are comprised of the turn portions 52 stacked in the radial directions of the stator core 30. In the stator coil 40 of this type, it is possible to more sufficiently exert the cooling effect by the coolant supplied to the first and second coil end parts 47 and 48.

Second Embodiment

Figure 11:
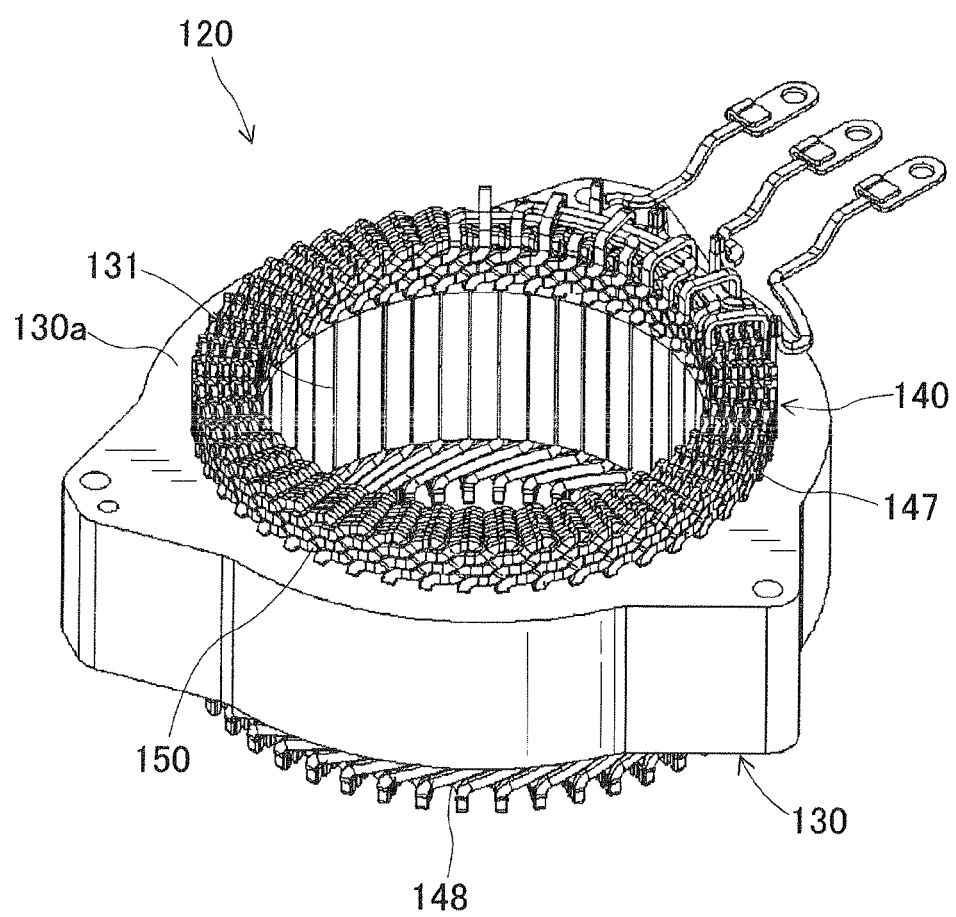
FIG. 11 is a perspective view, from the electric conductor segments-inserting side, of a stator according to a second embodiment.
Figure 12:
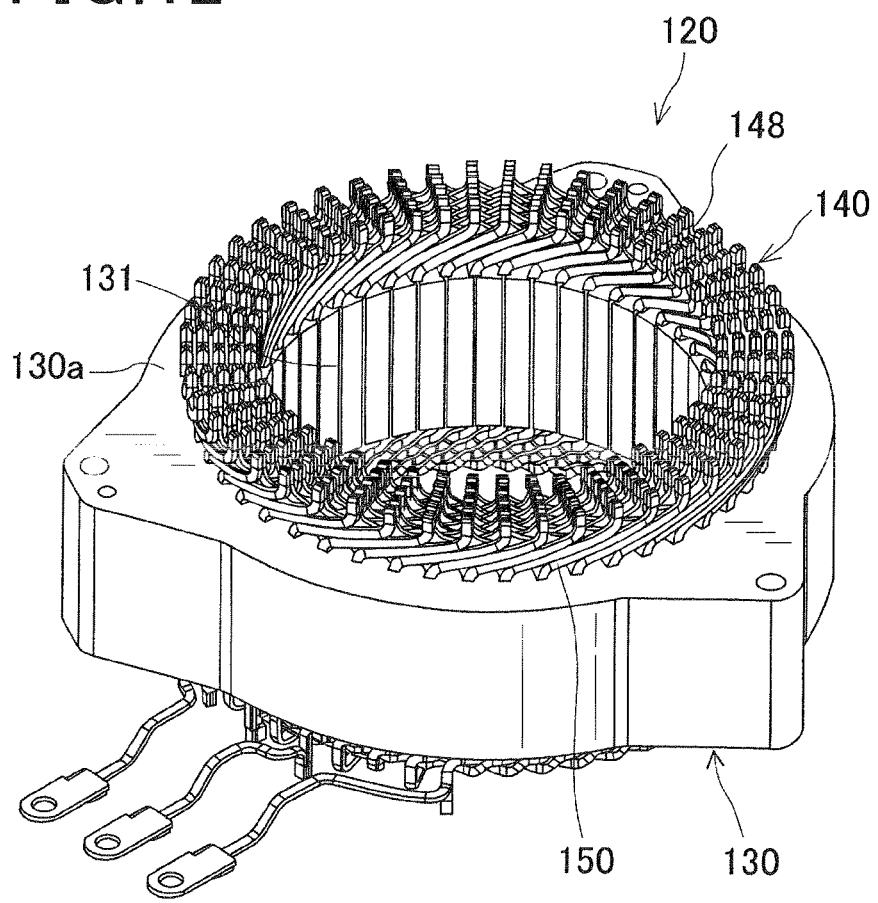
FIG. 12 is a perspective view, from the electric conductor segments-welding side, of the stator according to the second embodiment.
Figure 13:
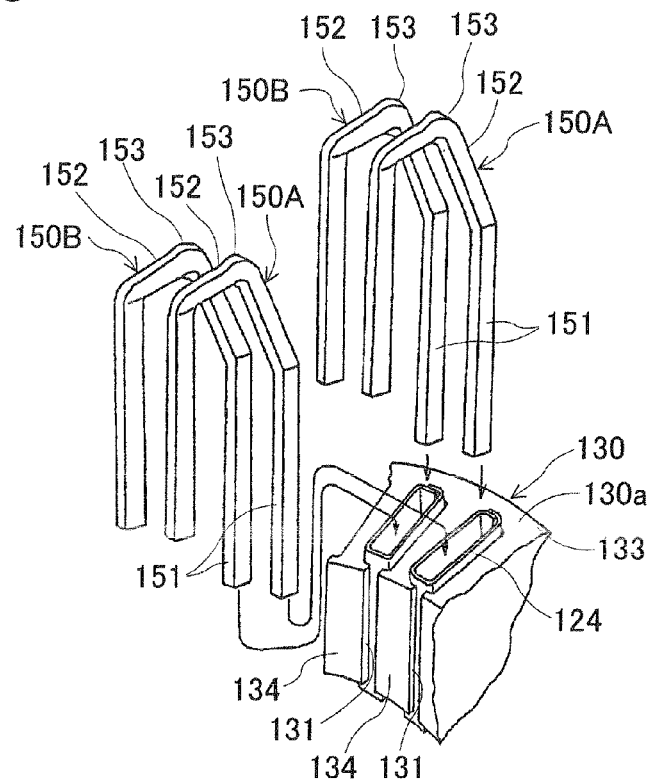
FIG. 13 is a schematic view illustrating the state of inserting the electric conductor segments into slots of a stator core according to the second embodiment.

FIG. 11 is a perspective view, from an electric conductor segments-inserting side, of a stator according to a second embodiment. FIG. 12 is a perspective view, from an electric conductor segments-welding side, of the stator according to the second embodiment. FIG. 13 is a schematic view illustrating the state of inserting the electric conductor segments into slots of a stator core according to the second embodiment.

The stator 120 of the present embodiment is, as in the first embodiment, configured to be mounted in a rotating electric machine 1 that is used as an automotive alternator. However, this embodiment differs from the first embodiment in that as shown in FIGS. 11-13, a segment-type stator coil 140 is employed which is formed by mounting a plurality of substantially U-shaped electric conductor segments 150 to the stator core 130 and connecting them into a predetermined state.

The stator 120 of the present embodiment includes the annular stator core 130 and the stator coil 140 that is formed by connecting the plurality of electric conductor segments into the predetermined state. Each of the electric conductor segments has a pair of straight portions, a turn portion that connects a pair of ends of the straight portions, and a pair of open end portions that are formed by bending the other ends of the straight portions.

The stator core 130 is a unitary core that is formed by laminating a plurality of annular magnetic steel sheets in the axial direction of the stator core 30. The stator core 130 includes an annular back core portion 133 and a plurality of teeth 134 that protrude from the back core portion 133 radially inward and are arranged in the circumferential direction at predetermined intervals. Between each adjacent pair of the teeth 134, there is formed one of the slots 131.

The stator coil 140 mounted on the stator core 130 is formed of the plurality of substantially U-shaped electric conductor segments 150, corresponding ends of which are joined together. Most of the outer periphery of each of the electric conductor segments 150 except for both the ends is covered with a not-shown insulating coat. Each of the electric conductor segments 150 is, as shown in FIG. 13, substantially U-shaped to include the pair of straight portions 151 extending parallel to each other and the turn portion 152 that connects the ends of the straight portions 151. At the center of the turn portion 152, there is formed an apex section 153 that extends substantially parallel to an end face 130a of the stator core 130. On both sides of the apex section 153, there are formed oblique portions 155 that are oblique to the end face 130a of the stator core 130 at predetermined angles. In addition, in FIG. 13, there are shown two pairs of the electric conductor segments 150A and 150B to be inserted and arranged in two adjacent slots 131 of the same phase. Moreover, reference numeral 124 designates insulators that electrically insulate between the stator core 130 and the stator coil 140.

For each of the U-shaped electric conductor segments 150, the pair of straight portions 151 of the segment 150 are inserted, from one axial side of the stator core 130, respectively into two slots 131 of the stator core 130 which are away from each other by a predetermined one-magnetic-pole pitch. In this way, all the slots 131 have a predetermined number of the straight portions 151 of the electric conductor segments 150 inserted and arranged therein. In the present embodiment, in each of the slots 131, there are radially aligned a total of ten straight portions 151 (in 10 layers).

Thereafter, the open end portions of the pair of straight portions 151, which protrude from the slots 131 toward the other axial side, are respectively bent toward opposite circumferential sides so as to obliquely extend at predetermined angles, forming oblique portions 154 (see FIG. 16) having a length of substantially half a magnetic pole pitch. Then, on the other axial side of the stator core 30, predetermined pairs of the oblique portions 154 of the electric conductor segments 150 are joined by welding at their ends, thereby being electrically connected in a predetermined pattern. That is, each predetermined pair of the oblique portions 154 are connected at their ends to form one connecting portion 156. Consequently, predetermined electric conductor segments 150 are serially connected, forming the stator coil 140 that is mounted on the stator core 130 and includes three phase windings (U-phase, V-phase and W-phase windings).

In addition, for each phase of the stator coil 140, a winding (or coil) that extends around the stator core 130 by ten turns is formed basically with the U-shaped electric conductor segments 150. However, for each phase of the stator coil 140, there are also used specially-shaped segments that are different in shape from the basic electric conductor segments 150; those specially-shaped segments include a segment that has both an output lead wire and a neutral-point lead wire integrally formed therewith and a segment that has a turn portion for connecting the first and second turns of the phase winding. With the specially-shaped segments, ends of the phase windings of the stator coil 140 are connected into a star connection.

In addition, the stator coil 140 according to the present embodiment can also be regarded as being comprised of a plurality of electric conductor wires each of which is formed by connecting a predetermined number of the electric conductor segments 150.

Figure 14:
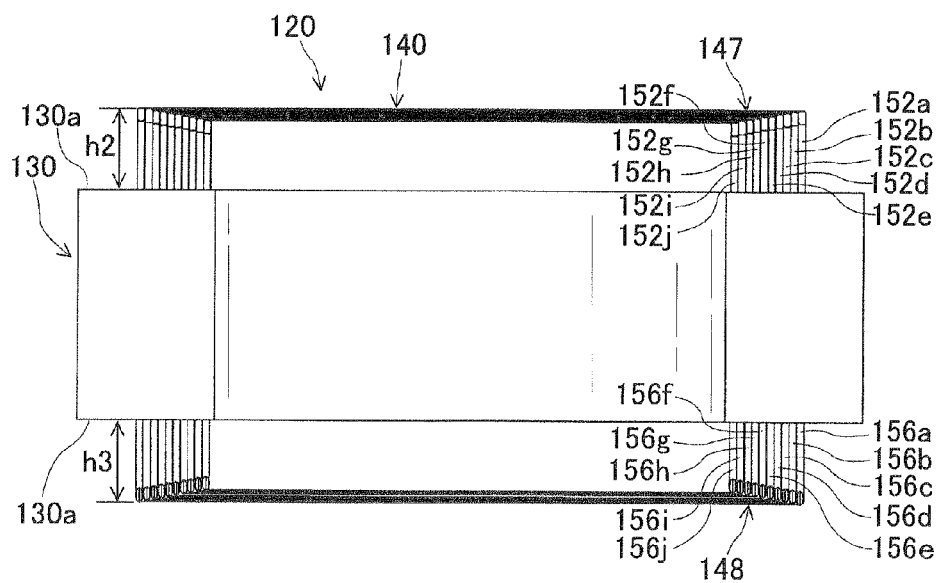
FIG. 14 is a front view, from the radially outside, of turn portions that are radially stacked and arranged at first and second coil end parts of a stator coil according to the second embodiment.

At one axial end of the stator coil 140 formed as described above, as shown in FIGS. 14 and 15, there is a first coil end part 147 formed by the turn portions 152 of the electric conductor segments 150 which protrude from one end face of the stator core 130 and are stacked in radial directions of the stator core 130. At the first coil end part 147, for each radially-adjacent pair of the turn portions 152, the axial height h2 of the radially outer turn portion 152 is set to be greater than that of the radially inner turn portion 152. This relationship of axial height h2 applies to all the turn portions 152 at the first coil end part 147. Thus, the axial height h2 of the turn portions 152a which are located most radially outward is set to be largest; the axial height h2 of the turn portions 152j which are located most radially inward is set to be smallest. Moreover, at the first coil end part 147, the axial heights h2 of the turn portions 152 gradually increase from the radially inside to the radially outside of the first coil end part 147; all the axial heights h2 of the turn portions 152 located at different radial positions are different from each other.

In other words, for each radially-adjacent pair of the turn portions 152 at the first coil end part 147, the axial height h2 of the radially inner turn portion 152 is set to be less than that of the radially outer turn portion 152. Therefore, the radially inner turn portion 152 is offset and thus protrudes axially inward from the radially outer turn portion 152 by a predetermined amount. That is, as shown FIG. 15, when the first coil end part 147 is viewed from the radially outside, the turn portions 152b-152j other than the radially outermost turn portion 152a are offset and thus protrude axially inward from the adjacent radially outer turn portions 152, thereby exposing the protruding parts thereof. Consequently, the contact area between the turn portions 152b-152j other than the radially outermost turn portion 152a at the first coil end part 147 and the coolant are increased by the protruding parts thereof.

Figure 15:
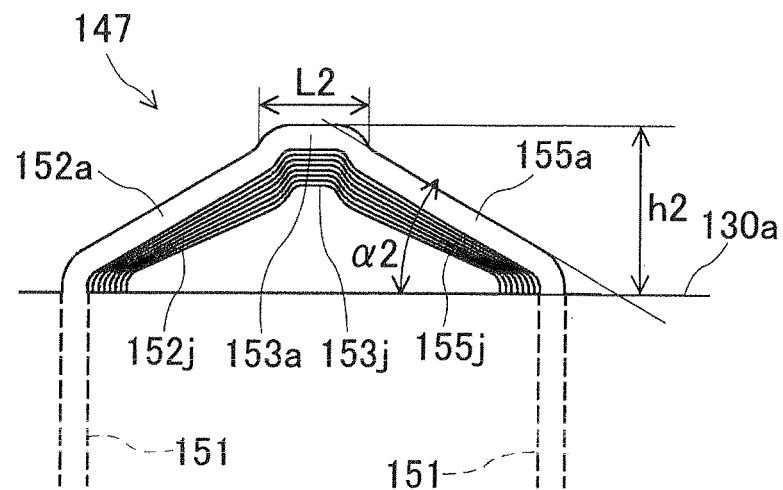
FIG. 15 is a front view, from the radially outside, of the turn portions that are radially stacked and arranged at the first coil end part of the stator coil according to the second embodiment.

Moreover, for the apex sections 153 of the turn portions 152, the extending-direction lengths L2 are set so as to gradually increase from the radially inside to the radially outside of the first coil end part 147 (see FIG. 15). Thus, the extending-direction length L2 of the apex sections 153a of the radially outermost turn portions 152a at the first coil end part 147 is set to be largest, whereas the extending-direction length L2 of the apex sections 153j of the radially innermost turn portions 152j is set to be smallest.

Furthermore, for the oblique portions 155 of the turn portions 152, the oblique angles α2 thereof with respect to the end face 130a of the stator core 130 are set so as to gradually increase from the radially inside to the radially outside of the first coil end part 147 (see FIG. 15). Thus, the oblique angles α2 of the turn portions 152a which are located most radially outward at the first coil end part 147 are set to be largest, whereas the oblique angles α2 of the turn portions 152j which are located most radially inward are set to be smallest.

On the other hand, at the other axial end of the stator coil 140, there is a second coil end part 148 formed by the connecting portions 156 of the electric conductor segments 150 which protrude from the other end face of the stator core 130 and are stacked in radial directions of the stator core 130. At the second coil end part 148, for each radially-adjacent pair of the connecting portions 156, the axial height h3 (i.e., the height from the end face 130a of the stator core to the ends-joined portion 157) of the radially outer connecting portion 156 is set to be greater than that of the radially inner connecting portion 156. This relationship of axial height h3 applies to all the connecting portions 156 at the second coil end part 148. Thus, the axial height h3 of the connecting portions 156a which are located most radially outward is set to be largest; the axial height h3 of the connecting portions 156j which are located most radially inward is set to be smallest. Moreover, at the second coil end part 148, the axial heights h3 of the connecting portions 156 gradually increase from the radially inside to the radially outside of the second coil end part 148; all the axial heights h3 of the connecting portions 156 located at different radial positions are different from each other.

In other words, for each radially-adjacent pair of the connecting portions 156 at the second coil end part 148, the axial height h3 of the radially inner connecting portion 156 is set to be less than that of the radially outer connecting portion 156. Therefore, the radially inner connecting portion 156 is offset and thus protrudes axially inward from the radially outer connecting portion 156 by a predetermined amount. That is, as shown FIG. 16, when the second coil end part 148 is viewed from the radially outside, the connecting portions 156b-156j other than the radially outermost connecting portion 156a are offset and thus protrude axially inward from the adjacent radially outer connecting portions 156, thereby exposing the protruding parts thereof. Consequently, the contact area between the connecting portions 156b-156j other than the radially outermost connecting portion 156a at the second coil end part 148 and the coolant are increased by the protruding parts thereof.

Figure 16:
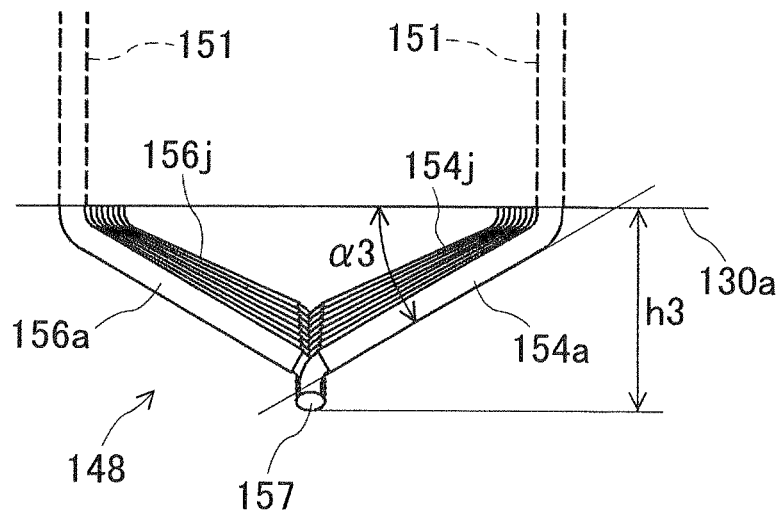
FIG. 16 is a front view, from the radially outside, of connecting portions that are radially stacked and arranged at the second coil end part of the stator coil according to the second embodiment.

Moreover, for the oblique portions 154 of the electric conductor segments 150, the oblique angles α3 thereof with respect to the end face 130a of the stator core 130 are set so as to gradually increase from the radially inside to the radially outside of the second coil end part 148 (see FIG. 16). Thus, the oblique angles α3 of the oblique portions 154a which are located most radially outward at the second coil end part 148 are set to be largest, whereas the oblique angles α3 of the oblique portions 154j which are located most radially inward are set to be smallest.

That is, in the present embodiment, with the first and second coil end parts 147 and 148 configured as described above, the coolant, which is supplied from the cooling pipes 15 and 16 of the coolant supply means to the radially outside of the first and second coil end parts 147 and 148, can easily flow radially inward of the first and second coil end parts 147 and 148. Further, the coolant, which has flowed to the radially inside of the first and second coil end parts 147 and 148, can make contact with the surfaces of all the turn portions 152 and connecting portions 156 in a wider range. Consequently, it is possible to improve the effect of cooling the stator coil 140 by the coolant supplied to the first and second coil end parts 147 and 148.

With the stator 120 of the present embodiment configured as described above, upon start of the operation of the rotating electric machine 1, as in the first embodiment, the coolant is supplied by the coolant supply means from the discharge openings 15a and 16a of the coolant pipes 15 and 16 to the radially outside of the first and second coil end parts 147 and 148. Consequently, the supplied coolant flows into the first and second coil end parts 147 and 148 from the radially outside, and then flows to the radially inside along the inner surfaces of the turn portions 152 and connecting portions 156 and the end faces 130a of the stator core 130, cooling the first and second coil end parts 147 and 148.

At this time, in the stator 120 of the present embodiment, as in the first embodiment, at the first coil end part 147, for each radially-adjacent pair of the turn portions 152, the axial height h2 of the radially outer turn portion 152 is set to be greater than that of the radially inner turn portion 152, and the radially inner turn portion 152 protrudes axially inward and thus are exposed from the radially outer turn portion 152; consequently, it is possible to sufficiently improve the cooling effect by the coolant supplied to the first coil end part 147.

Moreover, at the second coil end part 148, for each radially-adjacent pair of the connecting portions 156, the axial height h3 of the radially outer connecting portion 156 is set to be greater than that of the radially inner connecting portion 156, and the radially inner connecting portion 156 partially protrudes axially inward and thus are exposed from the radially outer connecting portion 156; consequently, it is possible to sufficiently improve the cooling effect by the coolant supplied to the second coil end part 148.

Furthermore, in the stator 120 of the present embodiment, since the axial heights h2 of the turn portions 152 and the axial heights h3 of the connecting portions 156 at the first and second coil end parts 147 and 148 gradually increase from the radially inside to the radially outside and thus all the turn portions 152 other than the radially outermost turn portions 152a and all the connecting portions 156 other than the radially outermost connecting portions 156a partially protrude axially inward and are exposed from the adjacent radially outer turn portions 152 and connecting portions 156, it is possible to efficiently and evenly improve the effect of cooling the first and second coil end parts 147 and 148 (the stator coil 140).

Moreover, in the present embodiment, each of the turn portions 152 and connecting portions 156 includes the oblique portions 155 or 154 on both sides of the center thereof. For each radially-adjacent pair of the oblique portions 155 or 154 at the first and second coil end parts 147 and 148, the oblique angle α2 or α3 of the radially outer oblique portion 155 or 154 is set to be greater than the oblique angle α2 or α3 of the radially inner oblique portion 155 or 154. That is, the radially inner oblique portion 155 or 154 is arranged so as to partially protrude axially inward and thus be exposed from the radially outer oblique portion 155 or 154. Consequently, it is possible to sufficiently improve the effect of cooling the stator coil 140 by the coolant supplied to the first and second coil end parts 147 and 148.

Furthermore, each of the turn portions 152 of the electric conductor segments 150 in the present embodiment has the apex section 153 at the center in the extending direction. For each radially-adjacent pair of the apex sections 153 at the first coil end part 147, the extending-direction length L2 of the radially outer apex section 153 is set to be greater than the extending-direction length L2 of the radially inner apex section 153. Consequently, the turn portions 152, which respectively have those apex sections 153 which have a shorter extending-direction length L2 than the adjacent radially outer apex sections 153 among all the apex sections 153 radially stacked at the first coil end part 147, are increased in contact area between their oblique portions 155 and the coolant. Therefore, it is possible to further improve the effect of cooling the stator coil 140 by the coolant supplied to the first coil end part 147.

Other Embodiments

In addition, the present invention is not limited to the above-described first and second embodiments and can be modified in various ways without departing from the spirit of the invention.

For example, in the first embodiment, the axial heights h1 of the turn portions 52 at the first and second coil end parts 47 and 48 are set so as to gradually increase from the radially inside to the radially outside, and all the axial heights h1 of the turn portions 52 located at different radial positions are different from each other. However, as at the first coil end part 47A shown in FIG. 17, the axial heights h1 of the eight radially-stacked turn portions 52a-52h can be set so as to increase once for every two turn portions 52 from the radially inside to the radially outside.

Figure 17:
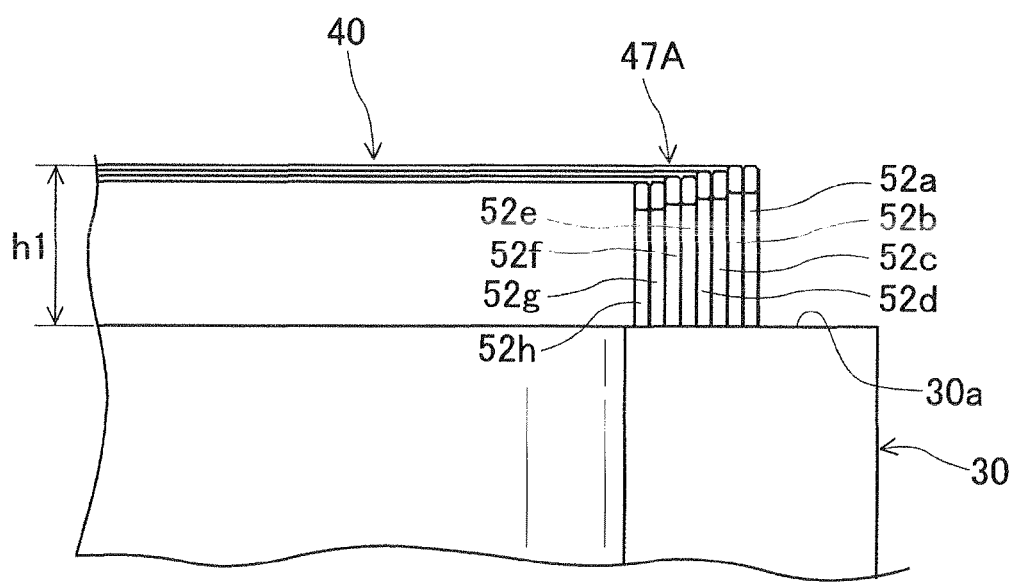
FIG. 17 is a front view, from the radially outside, of turn portions that are radially stacked and arranged at a first coil end part of a stator coil according to another embodiment.

Moreover, at the first coil end part 47A shown in FIG. 17, the number of the turn portions 52 having the same axial height h1 is equal to 2. However, the number of the turn portions 52 having the same axial height h1 can be irregularly varied from the radially inside to the radially outside in a range from 0 to any plural number, provided that the axial height h1 of the radially outermost turn portion 52*a* is set to be at least greater than that of the radially innermost turn portion 52*h*. Accordingly, in the case of the first coil end part 47A shown in FIG. 17, the number of the turn portions 52 having the same axial height h1 can be equal to 7 at a maximum.

In addition, the above-described manner of varying the axial heights h1 of the turn portions 52 at the first and second coil end parts 47 and 48 can also be applied to the axial heights h2 and h3 of the turn portions 152 and connecting portions 156 at the first and second coil end parts 147 and 148 in the second embodiment.

DESCRIPTION OF CHARACTERS

1: rotating electric machine; 10: housing; 11 and 12: bearings; 13: rotating shaft; 14: rotor; 20: stator; 30: stator core; 31: slots; 32: core segments; 33: back core portion; 34: teeth; 37: outer cylinder; 40: stator coil; 46: in-slot portion-stacked part; 47, 47A and 147: first coil end part; 48 and 148: second coil end part; 50: electric conductor wires; 51: in-slot portions; 52 and 152: turn portions (electric conductor wires); 53 and 153: apex sections; 55 and 155: oblique portions; 56 and 57: sections; 58: electric conductor; 59: insulating coat; 150: electric conductor segments; 154: oblique portions (open end portions); 156: connecting portions (connected open end portions, electric conductor wires); 157: ends-joined portions.

The invention claimed is:

1. A stator of a rotating electric machine, the stator comprising an annular stator core having a plurality of slots arranged in a circumferential direction at predetermined intervals and a stator coil formed of a plurality of electric conductor wires mounted on the stator core, wherein the stator coil has a pair of coil end parts that respectively protrude axially outward from a pair of axial end faces of the stator core, at each of the coil end parts, the electric conductor wires are stacked in a radial direction of the stator core, for each radially-adjacent pair of the electric conductor wires, an axial height of the radially outer electric conductor wire is set to be equal to or greater than that of the radially inner electric conductor wire, the axial height of the radially outermost electric conductor wire is set to be greater than that of the radially innermost electric conductor wire, each of the electric conductor wires has a plurality of in-slot portions received in the slots of the stator core and a plurality of turn portions that connect, on the outside of the slots, adjacent pairs of the in-slot portions, each of the turn portions includes, at its circumferential center, an apex section that extends substantially parallel to the corresponding axial end face of the stator core, at each of the coil end parts of the stator coil, for each radially-adjacent pair of the apex sections of the turn portions of the electric conductor wires, a length in an electric conductor wire-extending direction of the radially outer apex section is set to be equal to or greater than that of the radially inner apex section, the length in the electric conductor wire-extending direction of the radially outermost apex sections of the turn portions of the electric conductor wires is set to be greater than that of the radially innermost apex sections of the turn portions of the electric conductor wires, at each of the coil end parts of the stator coil, each of the electric conductor wires has a plurality of oblique portions that are oblique to a corresponding one of the axial end faces of the stator core at predetermined angles;

for each radially-adjacent pair of the oblique portions of the electric conductor wires, the oblique angle of the radially outer oblique portion is set to be equal to or greater than that of the radially inner oblique portion, and the oblique angles of the radially outermost oblique portions of the electric conductor wires are set to be greater than those of the radially innermost oblique portions of the electric conductor wires.

2. The stator of the rotating electric machine as set forth in claim 1, wherein each of the oblique portions of the electric conductor wires is stair-shaped to include a plurality of sections that extend substantially parallel to the corresponding axial end face of the stator core.

3. The stator of the rotating electric machine as set forth in claim 1, wherein at each of the coil end parts of the stator coil, the axial heights of the electric conductor wires are set so as to gradually increase from the radially inside to the radially outside of the coil end part.

4. The stator of the rotating electric machine as set forth in claim 1, wherein each of the electric conductor wires is made up of one continuous electric conductor wire which includes a plurality of in-slot portions and a plurality of turn portions, the in-slot portions extending straight in parallel with each other and being arranged in a longitudinal direction of the electric conductor wire at predetermined intervals, the turn portions connecting adjacent pairs of the in-slot portions;

each of the coil end parts of the stator coil is formed of those turn portions of the electric conductor wires which are located on one same axial side of the stator core;

at each of the coil end parts of the stator coil, for each radially-adjacent pair of the turn portions of the electric conductor wires, the axial height of the radially outer turn portion is set to be equal to or greater than that of the radially inner turn portion; and the axial height of the radially outermost turn portions of the electric conductor wires is set to be greater than that of the radially innermost turn portions of the electric conductor wires.

5. The stator of the rotating electric machine as set forth in claim 1, wherein each of the electric conductor wires is formed by connecting a plurality of electric conductor segments into a predetermined state, each of the electric conductor segments having a pair of straight portions, a turn portion that connects a pair of ends of the straight portions, and a pair of open end portions that are formed by bending the other ends of the straight portions;

one of the coil end parts of the stator coil is comprised of the turn portions of the electric conductor segments of the electric conductor wires, the turn portions being located on one axial side of the stator core;

the other coil end part is comprised of a plurality of connecting portions that are formed by connecting predetermined pairs of the open end portions of the electric conductor segments of the electric conductor wires, the open end portions being located on the other axial side of the stator core;

at the one coil end part, for each radially-adjacent pair of the turn portions of the electric conductor wires, the axial height of the radially outer turn portion is set to be equal to or greater than that of the radially inner turn portion;

the axial height of the radially outermost turn portions of the electric conductor wires is set to be greater than that of the radially innermost turn portions of the electric conductor wires;

at the other coil end part, for each radially-adjacent pair of the connecting portions of the electric conductor wires, the axial height of the radially outer connecting portion is set to be equal to or greater than that of the radially inner connecting portion; and the axial height of the radially outermost connecting portions of the electric conductor wires is set to be greater than that of the radially innermost connecting portions of the electric conductor wires.

6. The stator of the rotating electric machine as set forth in claim 1, wherein each of the coil end parts of the stator coil is supplied with coolant from the radially outside of the stator core.

* * * * *